(12) United States Patent
Smith

(10) Patent No.: US 9,255,400 B2
(45) Date of Patent: Feb. 9, 2016

(54) POLYURETHANE FOAM WALL STRUCTURE

(71) Applicant: Huntsman International LLC, The Woodlands, TX (US)

(72) Inventor: Jason Smith, Cranford, NJ (US)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 14/190,158

(22) Filed: Feb. 26, 2014

(65) Prior Publication Data

US 2014/0174011 A1 Jun. 26, 2014

Related U.S. Application Data

(62) Division of application No. 13/282,842, filed on Oct. 27, 2011, now Pat. No. 8,696,966.

(51) Int. Cl.

| E04B 2/56 | (2006.01) |
|---|---|
| E04B 2/84 | (2006.01) |
| B29C 39/10 | (2006.01) |
| E04B 1/38 | (2006.01) |

(52) U.S. Cl.
CPC ............... *E04B 2/847* (2013.01); *B29C 39/10* (2013.01); *E04B 2001/386* (2013.01)

(58) Field of Classification Search
USPC ............ 52/404.1, 407.3, 406.1, 407.2, 309.7, 52/309.4
See application file for complete search history.

(56) References Cited

U.S. PATENT DOCUMENTS

| 4,239,564 | A | 12/1980 | Krumweide | |
|---|---|---|---|---|
| 4,244,901 | A | 1/1981 | Wencley et al. | |
| 4,288,962 | A | 9/1981 | Kavanaugh | |
| 4,409,768 | A | 10/1983 | Boden | |
| 4,471,591 | A | 9/1984 | Jamison | |
| 4,604,250 | A * | 8/1986 | Ecker | 264/35 |
| 4,856,244 | A | 8/1989 | Clapp | |
| 4,944,126 | A * | 7/1990 | King | 52/202 |
| 5,067,296 | A | 11/1991 | Brown et al. | |
| 5,234,191 | A | 8/1993 | Bambacigno et al. | |
| 5,273,693 | A | 12/1993 | Rothwell et al. | |
| 5,365,716 | A | 11/1994 | Munson | |
| 5,765,330 | A | 6/1998 | Richard | |
| 6,481,172 | B1 | 11/2002 | Porter | |
| 6,662,516 | B2 | 12/2003 | Vandehey et al. | |
| 7,127,856 | B2 | 10/2006 | Hagen, Jr. et al. | |
| 7,168,216 | B2 | 1/2007 | Hagen | |
| 7,574,837 | B2 | 8/2009 | Hagen | |
| 8,282,871 | B2 | 10/2012 | Davies et al. | |
| 8,495,852 | B2 * | 7/2013 | Fay | 52/745.13 |
| 2006/0201089 | A1 | 9/2006 | Duncan et al. | |
| 2008/0313985 | A1 | 12/2008 | Duncan | |
| 2009/0320397 | A1 | 12/2009 | Hansbro et al. | |
| 2011/0086217 | A1 | 4/2011 | Crain et al. | |
| 2012/0317923 | A1 * | 12/2012 | Herdt et al. | 52/783.11 |
| 2013/0280467 | A1 * | 10/2013 | Fay | 428/68 |
| 2015/0093535 | A1 * | 4/2015 | Lambach | E04C 2/386 428/71 |

FOREIGN PATENT DOCUMENTS

JP          04282210 A     10/1992

* cited by examiner

*Primary Examiner* — Brent W Herring
(74) *Attorney, Agent, or Firm* — Robert A. Diaz

(57) ABSTRACT

A wall structure comprising a polyurethane backing is disclosed herein.

2 Claims, 3 Drawing Sheets

POLYURETHANE FOAM WALL STRUCTURE

CROSS-REFERENCE TO RELATED APPLICATION

This application is a divisional of U.S. patent application Ser. No. 13/282,842, filed Oct. 27, 2011, pending. The noted application is incorporated herein by reference.

BACKGROUND OF THE INVENTION

1. Field of the Invention

The present invention relates generally to a method of making a wall structure that comprises a polyurethane foam backing and the wall structure fabricated by such a method.

2. Background Information

Spray polyurethane foam insulation may be used within the cavity of a building assembly or on the exterior side of external sheathing. Foam insulation within the cavity is most common and can act as an air barrier in addition to insulation. When foam insulation is applied within the cavity, an external weather resistive barrier is applied to the outside of the external sheathing. Additionally, a vapor retarder may or may not be used within the wall assembly.

When foam insulation is applied to the outside of the external sheathing, the foam (closed cell in particular) acts as the weather resistive barrier, an air barrier, a moisture vapor retarder, and as insulation. In either case, a permanent external sheathing is used as a substrate upon which to apply the foam.

SUMMARY OF THE INVENTION

The present invention is directed to a method of fabricating a wall structure comprising: positioning a wall frame substantially adjacent and parallel to a first surface of a support platform, said wall frame being offset from the first surface of the support platform such that a space is formed between the wall frame and the first surface of the support platform, wherein the wall frame comprises one or more spaces defined by one or more support members that comprise the wall frame, and wherein a release layer is disposed on the first surface of the support platform and is positioned between the first surface of the support platform and the wall frame; contacting a first overflow lip against at least a portion of a first side of the support platform and at least a first portion of the wall frame, a second overflow lip against at least a portion of a second side of the support platform and at least a second portion of the wall frame, a third overflow lip against at least a portion of a third side of the support platform and at least a third portion of the wall frame, and a fourth overflow lip against at least a portion of a fourth side of the support platform and at least a fourth portion of the wall frame, wherein each of the first, second, third, and fourth overflow lips have a release layer disposed on a first surface of each overflow lip, said first surface of each of said overflow lips and the first surface of the support platform defining a cavity; applying a polyurethane foam composition onto the release layer disposed on the first surface of the support platform by introducing the polyurethane foam composition through the one or more spaces in the wall frame and into the cavity that is defined by the first surface of the support platform and the first surface of each first, second, third, and fourth overflow lips until such foam is in contact with at least a portion of the wall frame and fills at least a portion of the one or more spaces in the wall frame; curing the polyurethane foam composition to form a polyurethane foam layer thereby attaching the polyurethane foam layer to the wall frame; and releasing the cured polyurethane foam layer and the attached wall frame from each release layer thereby forming the wall structure by removing the support platform and each of the first, second, third, and fourth overflow lips from the cured polyurethane foam layer and removing any release layer attached to the cured polyurethane foam layer.

The present invention is also directed to a method of fabricating a wall structure comprising: positioning a wall frame substantially adjacent and parallel to a first surface of a support platform, wherein said wall frame comprises a first support member that is substantially parallel to a second support member, each of said first and second support members comprising a first end and a second end, and wherein a third support member connects a first portion of the first support member to a first portion of the second support member and a fourth support member connects a second portion of the first support member to a second portion of the second support member, and, optionally, wherein one or more internal support members may be disposed between and parallel to the third and fourth support members, each of said one or more internal support members having a first end that is connected to the first support member and a second end that is connected to the second support member, and wherein a release layer is disposed on the first surface of the support platform and is positioned between the first surface of the support platform and the wall frame; contacting a contact surface of the first support member against at least a portion of the first surface of the support platform at a first side, a contact surface of the second support member against at least a portion of the first surface of the support platform at a second side, a contact surface of the third support member against at least a portion of the first surface of the support platform at a third side, and a contact surface of the fourth support member against at least a portion of the first surface of the support platform at a fourth side, and wherein, if present, the one or more internal support members are positioned within the wall frame such that the one or more internal support members are offset from the first surface of the support platform such that a space is formed between the one or more additional support members and the first surface of the support platform; applying a polyurethane foam composition onto the release layer disposed on the first surface of the support platform by introducing the polyurethane foam composition through one or more spaces defined by the first, second, third, fourth, and, if present, one or more internal support members of the wall frame and into the cavity that is defined by the first surface of the support platform until such foam is in contact with at least a portion of the wall frame and fills at least a portion of the spaces defined by the first, second, third, fourth, and, if present, one or more internal support members; curing the polyurethane foam composition to form a polyurethane foam layer thereby attaching the polyurethane foam layer to the wall frame; and releasing the cured polyurethane foam layer and the attached wall frame from the release layer on the support platform thereby forming the wall structure by removing the support platform from each of the first, second, third, and fourth support members and cured polyurethane foam layer and removing any release layer attached to the cured polyurethane foam layer.

The present invention is also directed to a wall structure comprising a wall frame, said wall frame comprising a first support member that is substantially parallel to a second support member, each of said first and second support members comprising a first end and a second end, and wherein a third support member connects a first portion of the first support member to a first portion of the second support member and a fourth support member connects a second portion of the first support member to a second portion of the second support member, and, optionally, wherein one or more internal support members may be disposed between and parallel to the third and fourth support members, each of said one or more additional support members having a first end that is connected to the first support member and a second end that is connected to the second support member, wherein one or more spaces are defined by the first, second, third, fourth, and, if present, one or more internal support members of the wall frame, wherein the one or more spaces are at least partially filled with a polyurethane foam layer and wherein a surface of the polyurethane foam layer forms a backing to the wall, and wherein an external layer is not disposed on a portion of the surface of the polyurethane foam layer that forms the backing of the wall.

BRIEF DESCRIPTION OF THE DRAWINGS

A full understanding of the invention can be gained from the following description of certain embodiments of the invention when read in conjunction with the accompanying drawings in which.

DETAILED DESCRIPTION OF THE INVENTION

Figure 1:
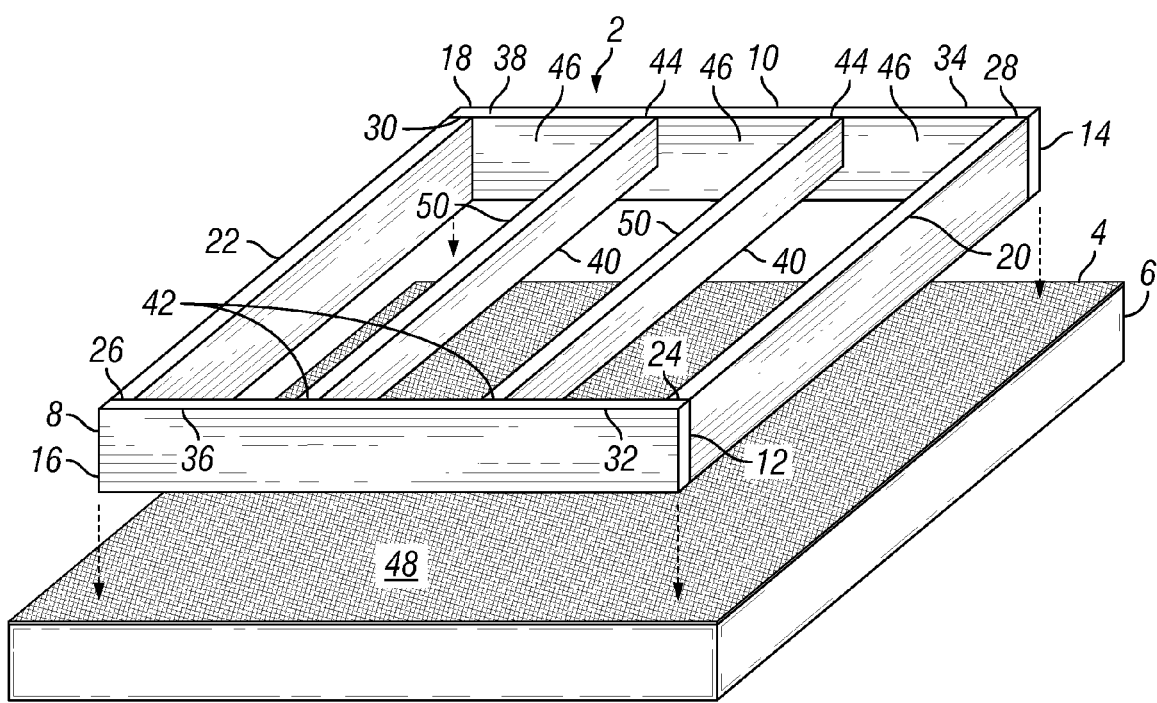
FIG. 1 depicts one embodiment of the various components described herein.

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein to "a" release layer, "a" support platform, "an" overflow lip, a combination (a plurality) of these components can be used in the present invention.

As used herein, "plurality" means two or more.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

Process

The present invention is directed to a method of fabricating a wall structure that comprises a polyurethane backing. In certain embodiments, no additional layer is coated onto or disposed on the polyurethane backing that is formed through the process disclosed herein.

With reference to FIG. 1, in one embodiment, the method comprises positioning a wall frame 2 substantially adjacent and parallel to a first surface 4 of a support platform 6. The wall frame 2 is composed of a first support member 8 and a second support member 10 that, in some embodiments, is oriented substantially parallel to the first support member 8. It is noted that while FIG. 1 depicts the first and second support members 8, 10 as having a substantially linear shape, one or both of these support members can have a different shape. For example, in some embodiments, the first support member 8 can have a substantially arcuate (e.g., curved) shape while the second support member 10 can have a substantially linear shape as is depicted in FIG. 1. Each of the first and second support members 8, 10 has a first end 12, 14 and a second end 16, 18. Connecting the first and second support members 8, 10 are a third and fourth support members 20, 22. Each of the third and fourth support members 20, 22 has a first end 24, 26 and a second end 28, 30. The first and second ends 24, 28 of the third support member 20 connect a first portion 32 of the first support member 8 to a first portion 34 of the second support member 10. Additionally, the first and second ends 26, 30 of the fourth support member 22 connect a second portion 36 of the first support member 8 to a second portion 38 of the second support member 10. While FIG. 1 depicts the first and seconds ends 24, 26, 28, 30 of each of the third and fourth support members 20, 22 as being substantially flush to the first and second ends 12, 14, 16, 18 of each of the first and second support members 8, 10, in some embodiments, the third and fourth support members 20, 22 may be offset from the ends 12, 14, 16, 18 of the first and second support members 8, 10 by a distance selected by the user. In these particular embodiments, the wall frame 2 would have a substantially "I" shape outline or cross section (e.g., similar to a cross section of an I-beam). In yet other embodiments, only one of the third or fourth support members 20, 22 is offset from the ends 12, 14, 16, 18 of the first and second support members 8, 10.

While the each of the first, second, third, and fourth support members 8, 10, 20, 22 may be made of any suitable material used in the housing or building industry and have any dimensions that are suitable for those industries, in certain embodiments, each of the first, second, third, and fourth support members 8, 10, 20, 22 can comprise a material, such as wood, steel, or a composite, having a nominal 2 inch×4 inch or a nominal 2 inch×6 inch dimension as is known in the lumber industry. For example, in FIG. 1, the first, second, third, and fourth support members 8, 10, 20, 22 have a nominal 2 in.×6 in. dimension. Additionally, each of the first, second, third, and fourth support members 8, 10, 20, 22 may be connected to one another via mechanical fasteners that are known in the art. As used herein, the term "mechanical fastener" or variations thereof shall refer broadly to any suitable fastening, connecting or tightening mechanism including, but not limited to, screws, bolts, and the combination of bolts and nuts.

While in some embodiments, no additional support members are disposed within the space that is defined by the first, second, third, and fourth support members 8, 10, 20, 22, in the embodiment depicted in FIG. 1, the wall frame 2 does comprise one or more internal support members 40 each having a first end 42 and a second end 44. The first end 42 of each of the one or more internal support members 40 connects the internal support member 40 to the first support member 8 while the second end 44 of each of the one or more internal support members 40 connects the internal support member 40 to the second support member 10.

Similar to the first, second, third, and fourth support member 8, 10, 20, 22 described above, each of the internal support members 40 may be made of any suitable material used in the housing or building industry and have any dimensions that are suitable for those industries. Accordingly, in certain embodiments, each of the first, second, third, and fourth support members 8, 10, 20, 22 can comprise a material, such as wood, steel, or a composite, having a nominal 2 inch×4 inch or a nominal 2 inch×6 inch dimension while one or more of the internal support members 40 can also have a nominal 2 inch×4 inch or a nominal 2 inch×6 inch dimension. Each internal support member 40 can be connected to the first and second support members 8, 10 using the mechanical fasteners as described above. If used, the internal support members 40 and the first, second, third, and fourth support members 8, 10, 20, 22 will define one or more spaces 46 in the wall frame 2. Referring to FIG. 1, in this particular embodiment, the spaces 46 are defined by the support members that comprise the wall frame (i.e., first, second, third, and fourth support members 8, 10, 20, 22) and the internal support members 40 that are disposed within the wall frame 2.

As stated above, the wall frame 2 is positioned substantially parallel to the support platform 6. The support platform 6 is made from a material, such as wood, oriented strand board, plastic, which can provide a firm structural backing onto which a polyurethane foam composition can be introduced as described below. Depending on the method used, the support platform 6 can be any dimension. However, as depicted in FIG. 1, the outer perimeter dimensions of the support platform 6 are at least equal to or greater than the outer perimeter dimensions of the wall frame 2. Referring to FIG. 1, the support platform 6 has a first surface 4 onto which a release layer 48 is disposed. That is, the release layer 48 is disposed between the first surface 4 of the support platform 6 and the wall frame 2. The release layer 48 can be made from any type of material provided that it exhibits minimal adhesion properties to polyurethane materials. For example, in certain embodiments, the release layer 48 can be made from polyethylene. The release layer 48 can either be adhered to the first surface 4 of the support platform 6 via methods known in the art (e.g., via an adhesive material or mechanical fastener) or, alternatively, the release layer 48 can simply be placed over the first surface 4 of the support platform 6 without the use of an adhesive material.

Referring to FIG. 1, in this particular embodiment, the wall frame 2 is positioned (e.g., lowered) onto the support platform 6 such that at least a portion of each of the first, second, third, and fourth support members 8, 10, 20, 22 are in contact with the release layer 48 that is disposed on the first surface 4 of the support platform 6. The wall frame 2 may be lowered onto the support platform 6 using any means that are known in the art. For example, a mechanical apparatus or, alternatively, one or more users may manually lower the wall frame 2 onto the support platform 6.

In the embodiment that is depicted in FIG. 1, once the wall frame 2 is lowered onto the support platform 6, the internal support members 40 are offset from the first surface 4 of the support platform 6 by a predefined distance. In the particular embodiment depicted in FIG. 1, the distance is 2 inches since each of the first, second, third, and fourth support members 8, 10, 20, 22 have a nominal 2 inch×6 inch dimension while each of the internal support members 40 have a nominal 2 inch×4 inch dimension. The offset distance is a space that is formed between the internal support members 40 and the first surface 4 of the support platform 6 into which the polyurethane foam composition will be introduced as discussed below. In some embodiments, however, there will be no offset distance between the first surface 4 of the support platform 6 and the internal support members 40 since the internal support members 40 can have dimensions that are identical to that of the support members that comprise the wall frame 8, 10, 20, 22.

Once the wall frame 2 is in position, a polyurethane foam composition is applied onto the first surface 4 of the support member 6 by introducing the polyurethane foam composition into the one or more spaces 46 that are defined by the first, second, third, and fourth support members 8, 10, 20, 22 and the internal support members 40. It should be understood that the polyurethane foam composition that is introduced through the aforementioned spaces 46 will typically only contact the release layer 48 that is disposed on the first surface 4 of the support platform 6 and not the first surface 4 itself.

Suitable polyurethane foam compositions that may be used in the present invention include those known in the art such as U.S. Pat. No. 6,495,722, which is incorporated in their entirety herein by reference. Accordingly, in some embodiments, polyurethane materials are produced from the reaction of an A-side reactant with a B-side reactant. The A-side reactant may comprise an isocyanate compound (e.g. methylene diphenyl diisocyanate (MDI)) while the B-side reactant may comprise an isocyanate reactive compound such as a polyol. Upon mixing, the A and B side reactants will undergo a chemical reaction to form the polyurethane material via chemical mechanisms that are well known in the art.

Suitable isocyanate compounds that may be used with the present invention include, without limitation, any aliphatic, cycloaliphatic, araliphatic and, preferably, aromatic polyisocyanates, such as toluene diisocyanate in the form of its 2,4 and 2,6-isomers and mixtures thereof and mixtures of diphenylmethane diisocyanates (MDI) and oligomers thereof having an isocyanate functionality greater than 2 known in the art as "crude" or polymeric MDI (polymethylene polyphenylene polyisocyanates), and mixtures of toluene diisocyanate and polymethylene polyphenylene polyisocyanates may be used as well. In addition, "pure" 4,4'-MDI and isomeric mixtures of 4,4'-MDI and up to 60% by weight of 2,4'-MDI and 2,2'-MDI may also be used. In certain embodiments, the amount of 2,2'-MDI in the isomeric mixtures will not exceed 2% by weight and can be characterized as an impurity while the remainder of the mixture comprises 4,4'-MDI and 2,4'-MDI. Accordingly, any SUPRASEC isocyanate compound (available from Huntsman International LLC) can be used in the present invention.

Suitable isocyanate reactive compounds include, without limitation, polyesters, polyesteramides, polythioethers, polycarbonates, polyacetals, polyolefins or polysiloxanes. Polyester polyols which may be used include hydroxyl-terminated reaction products of dihydric alcohols such as ethylene glycol, propylene glycol, diethylene glycol, 1,4-butanediol, neopentyl glycol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures.

Additional additives that may be included in one or both of the A and B sides include, without limitation, catalysts enhancing the formation of urethane bonds like tin catalysts like tin octoate and dibutyltindilaurate, tertiary amine catalysts like triethylenediamine and imidazoles like dimethylimidazole and other catalysts like maleate esters and acetate esters, surfactants, foam stabilizers (e.g., siloxane-oxyalkylene copolymers), fire retardants, smoke suppressants, UV-stabilizers, colorants, microbial inhibitors, organic and inorganic fillers, internal mould release agents (such agents may be used to further enhance the release of the materials made but are not essential), and external mould release agents, or mixtures thereof.

In the embodiments where the internal support members 40 are offset from the first surface 4 of the support platform 6, then the introduction of the polyurethane foam composition also fills the space that is formed between the first surface 4 of the support platform 6 and the internal support members 40. That is, if the internal support members 40 are offset from the first surface 4 of the support platform 6, then a cavity that is defined by the support members 8, 10, 20, 22 that comprise the wall frame 2, the internal support members 40, and the first surface 4 of the support platform 6 is also filled with the polyurethane foam composition.

The polyurethane foam composition can be applied by pouring or spraying the composition into the spaces 46 between the various support members 8, 10, 20, 22, 40. The mechanisms or processes used to pour or spray the polyurethane foam composition onto the first surface of the support member are well known in the art. For examples, in certain embodiments, a user may manually spray the polyurethane foam composition into the spaces and, if present, cavity using equipment that are well known in the art such as GRACO's Reactor E30 spray equipment. In other embodiments, a computer automated spray or pouring apparatus may be used to apply the polyurethane foam composition onto the first surface of the support platform.

The polyurethane foam composition is applied onto the first surface 4 of the support platform 6 until the polyurethane foam composition reaches a desired height. For example, in certain embodiments, the polyurethane foam composition will be applied until it reaches a predetermined height on the internal support members 40. For example, in some embodiments, the polyurethane foam composition is applied onto the first surface 4 of the support platform 6 until the foam is 2 inches below the top surface 50 of the internal support members 40 as depicted in FIG. 1. Therefore, in the embodiment depicted in FIG. 1, the polyurethane foam composition would fill not only the aforementioned cavity, but also at least a portion of the aforementioned spaces 46 as well.

After the polyurethane foam composition has been applied onto the first surface 4 of the support platform 6, the polyurethane foam composition is allowed to cure for a predetermined amount of time at a temperature near ambient room temperature (e.g., ~25° C.) thereby forming a polyurethane coating layer that comprises a backing to the wall structure. For example, in some embodiments, the polyurethane foam composition is allowed to cure for a timer period ranging from 1 second to 2 hours, such as from 15 seconds to 30 minutes or from 15 seconds to 5 minutes, at ambient temperature.

After the polyurethane foam composition has cured, the wall frame 2, which includes the cured polyurethane foam layer, is released from the release layer 48 that is disposed on the first surface 4 of the support platform 6. In certain embodiments, the wall frame 2 is released from the release layer 48 by lifting the wall frame 2 away from the first surface 4 of the support platform 6. This can be accomplished in an automated manner or it can involve one or more user manually lifting the wall frame 2 from the support platform 6. If, after lifting, the release layer 48 is still attached to a portion of the wall frame 2 or the polyurethane coating layer it is simply removed by the user. That is, the polyurethane coating layer does not have any other coating layers disposed on the surface of the cured polyurethane coating layer that comprises the backing of the wall structure. For example, the cured polyurethane coating layer does not contain any type of sheathing that is disposed on its surface nor does it have any type of coating layer (e.g., paint or cement) applied thereto.

Figure 2:
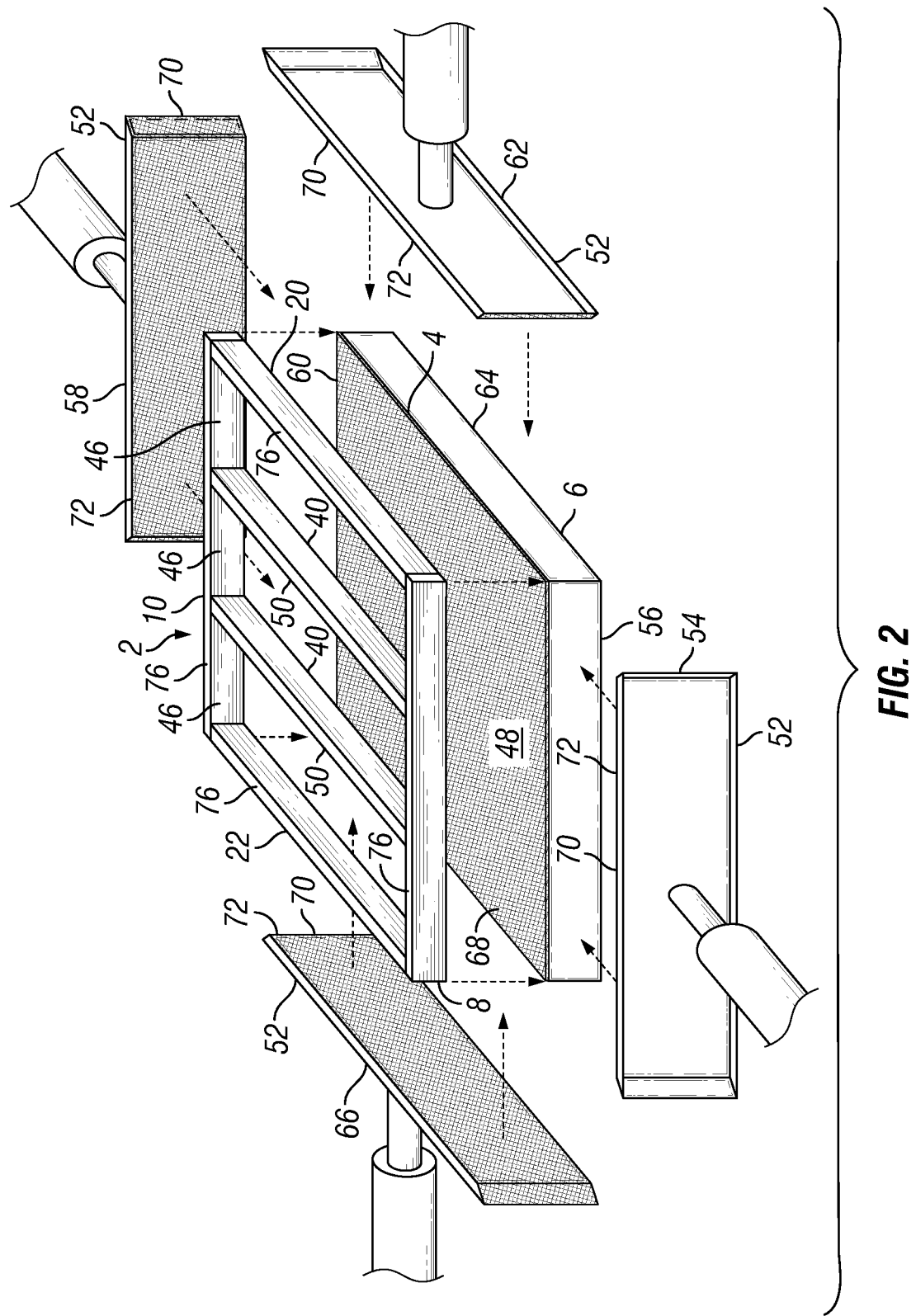
FIG. 2 depicts another embodiment of the various components described herein.

Referring to FIG. 2, the wall frame 2 is positioned substantially adjacent to and parallel to the support platform 6. Unlike the process described above, however, the wall frame 2 in this embodiment does not come into contact with the support platform 6. Rather, is if offset from the support platform 6 by a predetermined distance thereby forming a space between the between the wall frame 2 and the first surface 4 of the support platform 6 using techniques known in the art. For example, a mechanical apparatus, such as a crane, may be used to suspend the wall frame 2 over the support platform 6 at the desired distance. In some embodiments, the mechanical apparatus may be motorized and actuated via some type of automation process. In the particular embodiment depicted in FIG. 2, each of the support members 8, 10, 20, 22 that comprise the wall frame 2 in addition to the internal support members 40 are of the same dimensions. That is, each of the support members 8, 10, 20, 22, 40 has a nominal 2 in.×4 in. dimension.

Unlike the embodiment depicted in FIG. 1, however, in order to prevent the polyurethane foam composition from overflowing over the sides of the support platform 6 when the polyurethane coating composition is applied onto the first surface 4 of the support platform 6, a plurality of overflow lips 52 are used.

As can be seen in FIG. 2, several overflow lips 52 are positioned around the perimeter of the support platform 6. In certain embodiments, prior to introducing the polyurethane foam composition onto the first surface 4 of the support platform 6, each of the overflow lips 52 are positioned such that they come into contact with a particular side of the support platform 6. For instance, a first overflow lip 54 will contact a first side 56 of the support platform 6, a second overflow lip 58 will contact a second side 60 of the support platform 6, a third overflow lip 62 will contact a third side 64 of the support platform 6, and a fourth overflow lip 66 will contact a fourth side 68 of the support platform 6. Referring to FIG. 2, in certain embodiments, the first overflow lip 54 will also come into contact with the first support member 8, the second overflow lip 58 will come into contact with the second support member 10, the third overflow lip 62 will come into contact with the third support member 20, and the fourth overflow lip 66 will come into contact with the fourth support member 22. Accordingly, in these embodiments, each of the overflow lips 54, 58, 62, 66 must have sufficient dimensions (e.g., length and height) in order to come into contact with not only the support platform 6, but also the wall frame 2 that is offset from the first surface 4 of the support platform 6. Once in position against the support platform 6 and the wall frame 2, each of the overflow lips 54, 58, 62, 66, the wall frame 2, and the first surface 4 of the support platform 6 define a cavity into which the polyurethane foam composition will flow.

Each of the overflow lips 54, 58, 62, 66 can be positioned by use of a automated means (e.g., an automated actuator positioned behind each overflow lip which moves each overflow lip toward the support platform) or by manual means in which one or more users manually moves each overflow lip 54, 58, 62, 66 into position.

After each of the overflow lips 54, 58, 62, 66 are positioned against the appropriate sides 56, 60, 64, 68 of the support platform 6, the overflow lips 54, 58, 62, 66 can be mechanically fastened to one or both of the support platform 6 and the wall frame 2 provided that the fasteners can be removed after the polyurethane coating composition has cured. It should be noted, however, that in certain embodiments the overflow lips 54, 58, 62, 66 are not mechanically fastened to either the support platform 6 or the wall frame 2. In these embodiments, sufficient pressure is applied to each of the overflow lips 54, 58, 62, 66 to prevent them from moving out of alignment with the support platform 6 and the wall frame 2.

In certain embodiments, a release layer 70 is also disposed on a first surface 72 of each of the overflow lips 54, 58, 62, 66. The release layer 70 on each of the overflow lips 54, 58, 62, 66 can be made from the same material used in the release layer 48 that is disposed on the support platform 6. However, each of the release layers 48, 70 used in the disclosed system can also be different from one another.

While in the embodiment depicted in FIG. 2 the overflow lips 54, 58, 62, 66 surround the perimeter of the support platform 6 and the wall frame 2, in certain embodiments the support platform 6 has an outer perimeter dimension that is less than that of the wall frame 2. Accordingly, in these embodiments, the interior surface 74 on each of the overflow lips 54, 58, 62, 66 will be substantially in the same plane as the first surface 72 of each of the support members 8, 10, 20, 22 that comprise the wall frame 2 while also being in contact with the various sides 56, 60, 64, 68 of the support platform 6.

After the wall frame 2, the support platform 6, and each of the overflow lips 54, 58, 62, 66 are in position, the polyurethane foam composition is applied to the first surface 4 of the support platform 6 in the manner that is described above. Accordingly, the polyurethane foam will fill not only fill in a portion of the cavity that is formed by the wall frame 2, the first surface 4 of the support platform 6, and each of the overflow lips 54, 58, 62, 66, but it will also fill in at least a portion of the spaces 46 that are defined by the wall frame 2 and, if present, the internal support members 40.

After application of the polyurethane foam composition, the composition is allowed to cure as described above.

Once the polyurethane coating composition has been cured, the support platform 6 and each of the overflow lips 54, 58, 62, 66 are removed from the wall frame 2 and the cured polyurethane foam layer by using any techniques known in the art such as those described above. In the embodiments where mechanical fasteners were used to secure the overflow lips 54, 58, 62, 66 to one or both of the support platform 6 and the wall frame 2, then these mechanical fasteners are removed prior to removing the overflow lips 54, 58, 62, 66 from the support platform 6 and the wall frame 2. If any release layers 40, 70 are left on the wall frame 2 and the cured polyurethane foam layer, the release layers 40, 70 are removed as discussed above thereby leaving a wall structure that comprises a polyurethane coating layer that does not have any other layer (e.g., sheathing or coating layer) disposed on it.

Wall Structure

Figure 3:
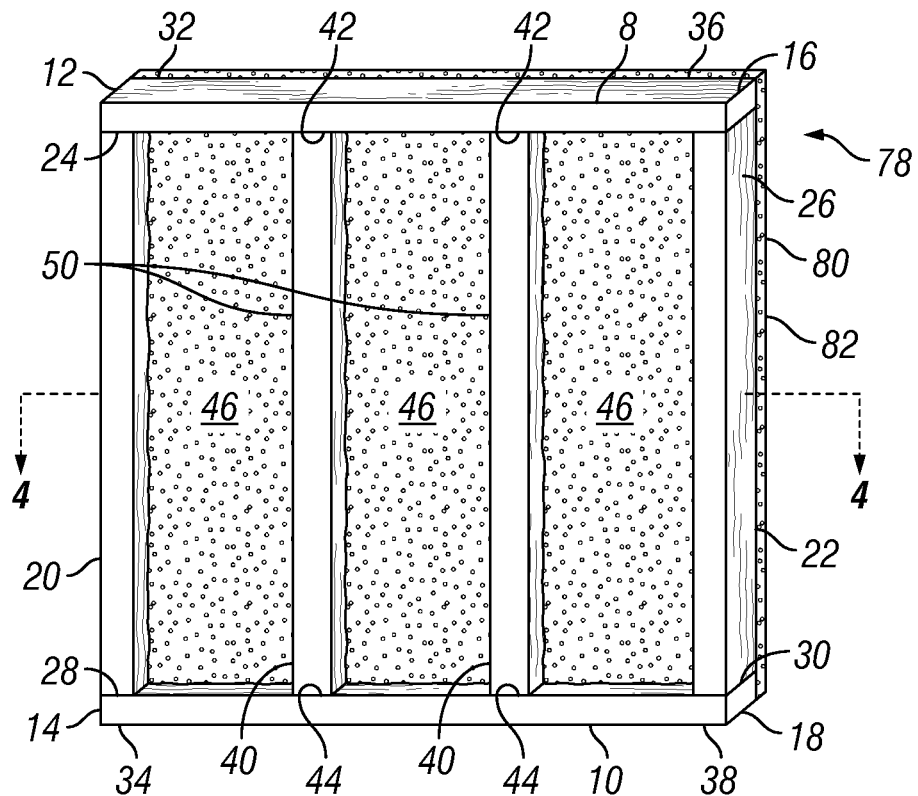
FIG. 3 depicts a wall structure formed using the components in FIG. 2.

A completed wall structure 78 comprising the wall frame 2 (including the internal support members) and the polyurethane foam layer 80 that comprises the backing 82 of the wall structure 78 is depicted in FIG. 3. In this particular embodiment, each of the support members 8, 10, 20, 22 comprising the wall frame as well as the internal support members 40 have a nominal 2 in.×4 in. dimension.

Figure 4:
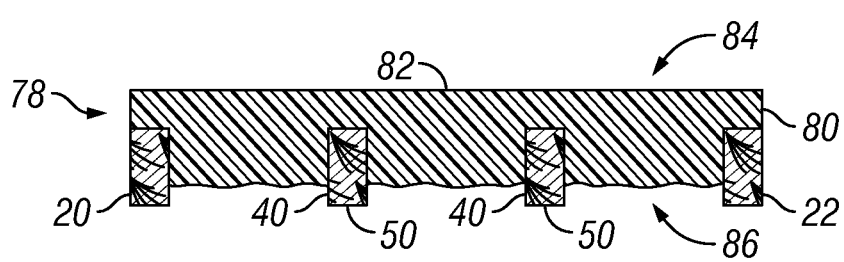
FIG. 4 is a cross sectional view along line 4-4 of FIG. 3.

FIG. 4 is a cross-sectional view of FIG. 3 along line 4-4. As can be seen in this embodiment, the cured polyurethane coating layer forms the backing 80 of the wall structure 78. Opposite the backing 80 are the spaces 46 that are defined by the various support members 8, 10, 20, 22 that comprise the wall frame 2 and the internal support members 40 and through which the polyurethane foam composition was applied. While, in FIG. 4, the polyurethane foam layer comprises the backing 80 of the wall structure 78 in, in some embodiments, a sufficient amount of polyurethane foam composition can be added such that the wall structure 78 would comprise two polyurethane layers, each of which are on opposite sides of the wall structure 78. That is, as oriented in FIG. 4, the polyurethane coating composition can be added in such an amount such that the wall structure 78 comprises a polyurethane foam layer on the top side 84 of the wall structure 78 as well as on the bottom side 86 of the wall structure 78. In these particular embodiments, all or substantially a large portion of the spaces 46 that are defined by the various support members 8, 10, 20, 22 that comprise the wall frame 2 and the internal support members 40 are filled with the cured polyurethane foam layer 80.

Figure 5:
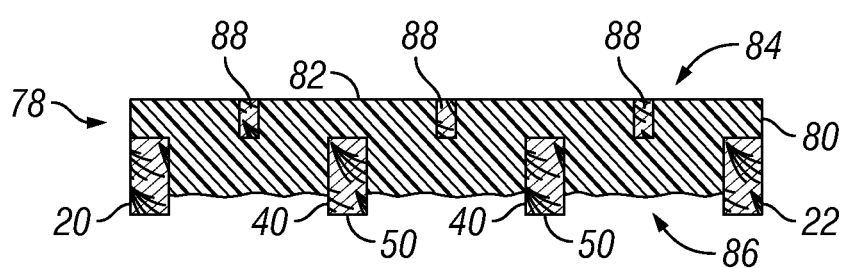
FIG. 5 is a cross section view of one embodiment of a wall structure described herein.

Similar to FIG. 4, FIG. 5 is a cross-sectional view of wall structure 78. Unlike the other embodiments, however, this particular embodiment comprises a plurality of additional internal support members or supplemental internal support members 88 that is disposed on the top side 84 of the wall structure 78. While the supplemental internal support members depicted in FIG. 5 have a nominal 1 inch×2 inch dimension, the supplemental internal support members can have any suitable dimension provided that it can positioned within the wall frame 2. In the embodiment that is depicted in FIG. 5, the top edge of each of the supplemental internal support members 88 are substantially on the same plane as the top side 84 of the wall structure 78. That is, the top edge of each supplemental internal support members 88 do not extend beyond the top side 84 of the wall structure 78. The process used to make the wall structure 78 depicted in FIG. 5 is substantially similar to the processes described above. However, prior to positioning the wall frame 2 substantially parallel to the support platform 6, the supplemental internal support members 88 are placed over the release layer 48 that is place over the first surface 4 of the support platform 6 in a desired orientation. The remainder of the process for making the wall structure 78 depicted in FIG. 5 then proceeds as described above. For example, in the process described in connection with FIG. 2, the supplemental internal support members 88 are positioned on the support platform 6 prior to lowering the wall frame 2 over the support platform 2 and prior to the overflow lips 54, 58, 62, 66 being positioned and secured as described above. The polyurethane foam composition is then applied as described above and, therefore, the foam composition will encase or come into contact with at least a portion of the supplemental internal support members 88.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof. Therefore, any of the features and/or elements which are listed above may be combined with one another in any combination and still be within the breadth of this disclosure.

What is claimed is:

1. A wall structure consisting of a wall frame, said wall frame consisting of a first support member, a second support member, a third support member, and a fourth support member, and a plurality of internal support members; wherein the first support member is substantially parallel to the second support member, each of said first and second support members comprising a first end and a second end; wherein the third support member connects a first portion of the first support member to a first portion of the second support member and the fourth support member connects a second portion of the first support member to a second portion of the second support member; wherein each internal support member is disposed between and parallel to the third and fourth support members and wherein each internal support member has a first end that is connected to the first support member and a second end that is connected to the second support member; wherein a plurality of spaces are defined by a lateral side of the first, second, third, fourth and the internal support members; wherein the plurality of spaces are partially filled with a polyurethane foam layer such that the lateral side of the first, second, third, and fourth support member is uncovered and free of the polyurethane foam; wherein a surface of the polyurethane foam layer forms a backing to the wall structure; and wherein an external layer is not disposed on a surface of the polyurethane foam layer that forms the backing of the wall structure.

2. The wall structure according to claim 1, wherein the polyurethane foam layer consists of a closed cell or an open cell polyurethane foam.

* * * * *